US012621317B1

(12) United States Patent
Xu

(10) Patent No.: US 12,621,317 B1
(45) Date of Patent: May 5, 2026

(54) UNSUPERVISED ANOMALOUS ACCESS DETECTION USING SENTENCE-BASED FEATURE EMBEDDINGS

(71) Applicant: Amazon Technologies, Inc., Seattle, WA (US)

(72) Inventor: Chenming Xu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 18/886,580

(22) Filed: Sep. 16, 2024

(51) Int. Cl.
*H04L 9/40* (2022.01)

(52) U.S. Cl.
CPC .................................. *H04L 63/1416* (2013.01)

(58) Field of Classification Search
CPC ................................................... H04L 63/1416
See application file for complete search history.

(56) References Cited

U.S. PATENT DOCUMENTS

| 10,803,169 B1 * | 10/2020 | Flatten ................ H04L 63/1425 |
| 11,977,536 B2 * | 5/2024 | Gonzalez Macias ..... G06F 7/08 |
| 12,033,048 B1 * | 7/2024 | Callot ................... G06F 18/214 |
| 12,073,182 B2 * | 8/2024 | Orhan ..................... H04L 41/16 |
| 12,112,252 B1 * | 10/2024 | Chen ....................... G06F 18/22 |
| 12,210,622 B1 * | 1/2025 | Zhang ................... G06F 21/554 |
| 12,393,773 B1 * | 8/2025 | Dolan ..................... G06F 40/40 |
| 2017/0118239 A1 * | 4/2017 | Most ....................... H04L 67/10 |
| 2020/0285737 A1 * | 9/2020 | Kraus ................... G06F 21/552 |

| 2020/0412726 A1 * | 12/2020 | Nevatia ................. H04L 63/102 |
| 2021/0397971 A1 * | 12/2021 | Pardeshi ................ G06N 3/047 |
| 2022/0124110 A1 * | 4/2022 | Chhabra ............. H04L 63/1425 |
| 2022/0171995 A1 * | 6/2022 | Balasubramanian .. G06N 20/00 |
| 2022/0342860 A1 * | 10/2022 | Gonzalez Macias ........................ H04L 63/1425 |
| 2022/0358289 A1 * | 11/2022 | Chen ................... G06F 18/2415 |
| 2023/0033818 A1 * | 2/2023 | Baughman ............ G06F 9/5072 |
| 2023/0267198 A1 * | 8/2023 | Karpovsky ........... G06F 21/552 726/23 |
| 2024/0112015 A1 * | 4/2024 | Inzelberg ............... G06N 3/045 |
| 2024/0126795 A1 * | 4/2024 | Zhong ..................... H04L 51/02 |
| 2024/0305453 A1 * | 9/2024 | Alsahnawi ............. G06N 5/022 |
| 2025/0086521 A1 * | 3/2025 | Farnan ................... G06N 20/20 |

(Continued)

OTHER PUBLICATIONS

"Benchmarks: Latest ADBench (2022)"; pyod 2.0.2 documentation; downloaded from <https://pyod.readthedocs.io/en/latest/benchmark. html> on Sep. 16, 2024, 6 pages.

(Continued)

*Primary Examiner* — Gary S Gracia
(74) *Attorney, Agent, or Firm* — Nicholson DeVos Webster & Elliott LLP

(57) ABSTRACT

Techniques for unsupervised anomalous access detection using sentence-based feature embeddings are described. Entity data describing users having access to a particular computing resource is obtained from a computing system and utilized, according to a sentence template, to construct descriptive sentences in a natural language format. The sentences are used to create dense vector embeddings via a sentence transformer machine learning (ML) model. The dense vector embeddings are used as input to an unsupervised anomaly detection ML model to detect anomalous users, which can be presented to an administrator.

20 Claims, 9 Drawing Sheets

(56)        References Cited

U.S. PATENT DOCUMENTS

2025/0088529 A1*   3/2025   Douglas ............. H04L 63/1491
2025/0150347 A1*   5/2025   Niv ................... G06Q 30/0271

OTHER PUBLICATIONS

Han, Songqiao et al., "ADBench: Anomaly Detection Benchmark";
36th Conference on Neural Information Processing Systems, 2022;
arXiv:2206.09426v2; 45 pages.
"Isolation Forest"; Wikipedia; downloaded from <https://en.wikipedia.
org/w/index.php?title=Isolation_forest&oldid=1194896889> on Jul.
1, 2024, 5 pages.

* cited by examiner

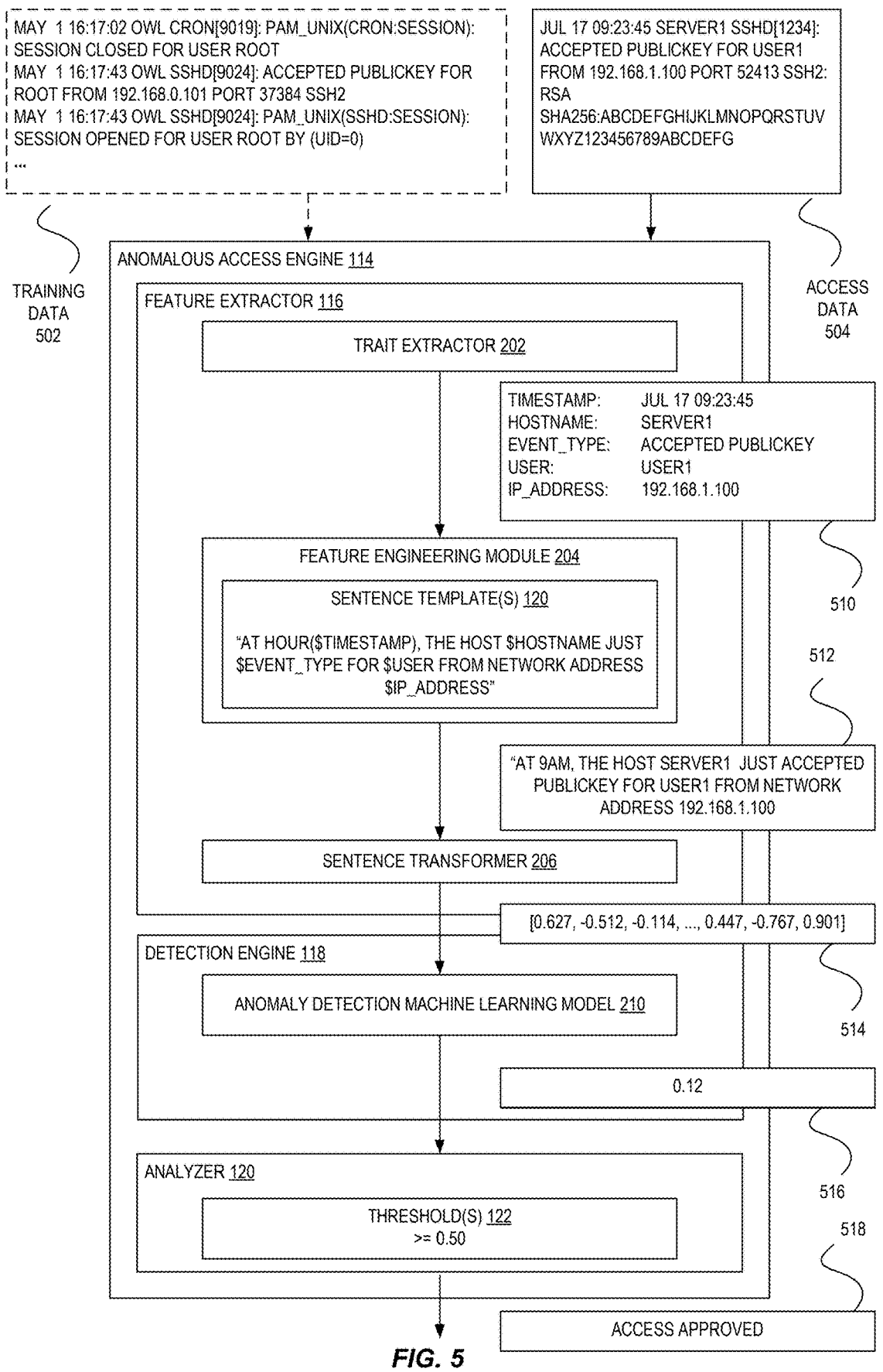

MAY  1 16:17:02 OWL CRON[9019]: PAM_UNIX(CRON:SESSION): SESSION CLOSED FOR USER ROOT
MAY  1 16:17:43 OWL SSHD[9024]: ACCEPTED PUBLICKEY FOR ROOT FROM 192.168.0.101 PORT 37384 SSH2
MAY  1 16:17:43 OWL SSHD[9024]: PAM_UNIX(SSHD:SESSION): SESSION OPENED FOR USER ROOT BY (UID=0)
...

JUL 17 09:23:45 SERVER1 SSHD[1234]: ACCEPTED PUBLICKEY FOR USER1 FROM 192.168.1.100 PORT 52413 SSH2: RSA SHA256:ABCDEFGHIJKLMNOPQRSTUVWXYZ123456789ABCDEFG

TRAINING DATA 502

ACCESS DATA 504

ANOMALOUS ACCESS ENGINE 114

FEATURE EXTRACTOR 116

TRAIT EXTRACTOR 202

TIMESTAMP:    JUL 17 09:23:45
HOSTNAME:    SERVER1
EVENT_TYPE:    ACCEPTED PUBLICKEY
USER:    USER1
IP_ADDRESS:    192.168.1.100

510

FEATURE ENGINEERING MODULE 204

SENTENCE TEMPLATE(S) 120

"AT HOUR($TIMESTAMP), THE HOST $HOSTNAME JUST $EVENT_TYPE FOR $USER FROM NETWORK ADDRESS $IP_ADDRESS"

512

"AT 9AM, THE HOST SERVER1  JUST ACCEPTED PUBLICKEY FOR USER1 FROM NETWORK ADDRESS 192.168.1.100"

SENTENCE TRANSFORMER 206

[0.627, -0.512, -0.114, ..., 0.447, -0.767, 0.901]

DETECTION ENGINE 118

ANOMALY DETECTION MACHINE LEARNING MODEL 210

514

0.12

516

ANALYZER 120

THRESHOLD(S) 122
>= 0.50

518

ACCESS APPROVED

*FIG. 5*

OPERATIONS
600

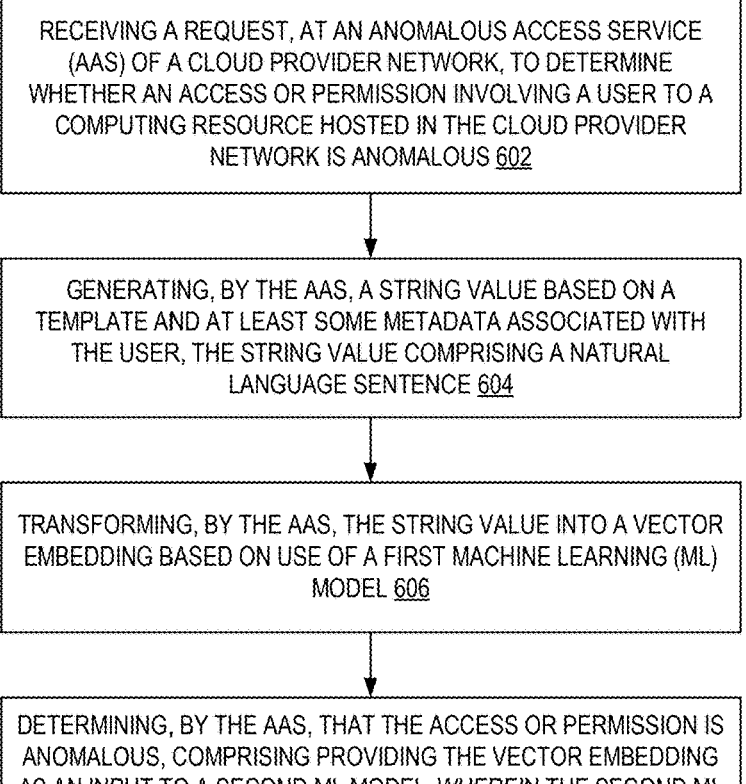

RECEIVING A REQUEST, AT AN ANOMALOUS ACCESS SERVICE (AAS) OF A CLOUD PROVIDER NETWORK, TO DETERMINE WHETHER AN ACCESS OR PERMISSION INVOLVING A USER TO A COMPUTING RESOURCE HOSTED IN THE CLOUD PROVIDER NETWORK IS ANOMALOUS 602

GENERATING, BY THE AAS, A STRING VALUE BASED ON A TEMPLATE AND AT LEAST SOME METADATA ASSOCIATED WITH THE USER, THE STRING VALUE COMPRISING A NATURAL LANGUAGE SENTENCE 604

TRANSFORMING, BY THE AAS, THE STRING VALUE INTO A VECTOR EMBEDDING BASED ON USE OF A FIRST MACHINE LEARNING (ML) MODEL 606

DETERMINING, BY THE AAS, THAT THE ACCESS OR PERMISSION IS ANOMALOUS, COMPRISING PROVIDING THE VECTOR EMBEDDING AS AN INPUT TO A SECOND ML MODEL, WHEREIN THE SECOND ML MODEL WAS TRAINED USING OTHER VECTOR EMBEDDINGS GENERATED BASED ON SENTENCES CORRESPONDING TO OTHER USERS 608

CAUSING, BY THE AAS, AN INDICATION OF THE DETERMINATION TO BE PROVIDED 610

*FIG. 6*

UNSUPERVISED ANOMALOUS ACCESS DETECTION USING SENTENCE-BASED FEATURE EMBEDDINGS

BACKGROUND

Organizations may use computing resources provided by cloud service providers in a variety of ways. Cloud services offer scalable, flexible, and cost-effective solutions for computing needs. Organizations can leverage Infrastructure as a Service (IaaS) to rent hardware like servers, storage, and networking technology. Platform as a Service (PaaS) provides a platform allowing customers to develop, run, and manage applications without the complexity of building and maintaining the infrastructure. Software as a Service (SaaS) delivers software applications over the internet on a subscription basis. These services eliminate the need for organizations to invest in and maintain their own costly information technology infrastructure. Additionally, cloud services provide the ability to scale resources up or down as needed, pay only for what is used, and access data and applications from anywhere, making them an attractive option for many users and organizations.

In an organization, assigning different permissions to access cloud computing resources is a critical aspect of managing security and operational efficiency. This process is typically managed through a system known as Identity and Access Management (IAM). IAM systems allow administrators to assign specific roles to each user or group of users, where each role has a defined set of permissions. These permissions determine what resources a user can access and what actions they can perform. For instance, a database administrator might have full access to manage databases, while a software developer might only have permission to read data from certain databases. This role-based access control (RBAC) helps to ensure that users only have access to the resources they need to perform their job functions, reducing the risk of accidental or malicious misuse of sensitive data or critical systems. Additionally, many cloud service providers offer tools for managing these permissions at a granular level, allowing organizations to customize their security protocols to fit their specific needs.

BRIEF DESCRIPTION OF DRAWINGS

Various examples in accordance with the present disclosure will be described with reference to the drawings, in which:

FIG. 5 is a diagram illustrating exemplary network-based processing for unsupervised anomalous access detection using sentence-based feature embeddings according to some examples.

FIG. 6 is a flow diagram illustrating operations of a method for unsupervised anomalous access detection using sentence-based feature embeddings according to some examples.

DETAILED DESCRIPTION

Figure 1:
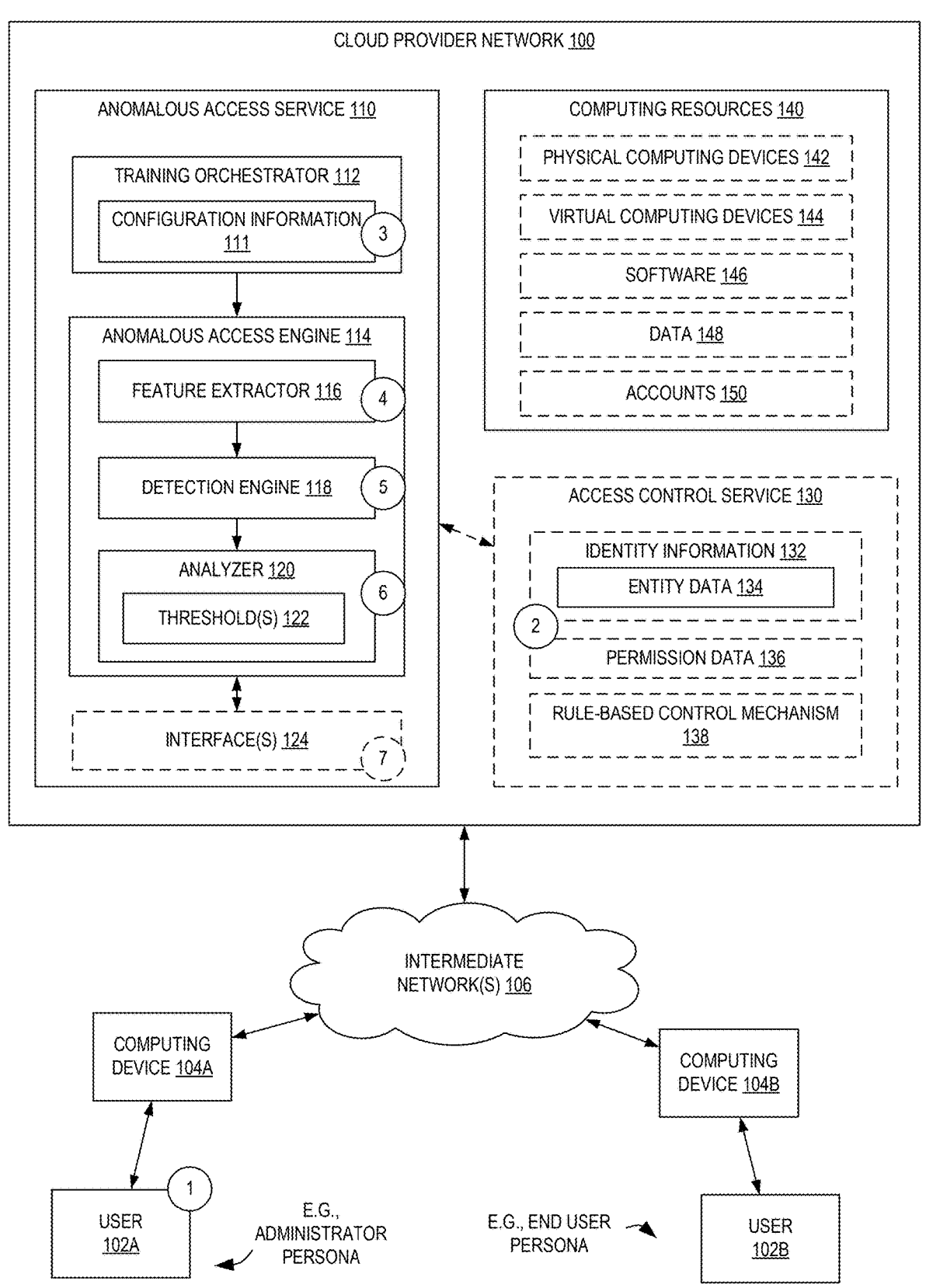
FIG. 1 is a diagram illustrating an environment for unsupervised anomalous access detection using sentence-based feature embeddings according to some examples.

In organizations of all sizes, managing employee access to sensitive computing resources, such as production hosts and cloud accounts, is a difficult yet critical aspect of corporate security. However, identifying employees with unusual or unnecessary access privileges is challenging, especially when dealing with a vast number of employees, large numbers and/or types of computing resources, and complex access control systems.

The present disclosure relates to methods, apparatus, systems, and non-transitory computer-readable storage media for unsupervised anomalous access detection using sentence-based feature embeddings. According to some examples, an anomalous access service can serve as a detection tool that leverages sentence embedding machine learning (ML) models to extract the meaning of user-related features along with an unsupervised learning ML model to identify users having unusual, or atypical, access permissions to computing resources such as production hosts or cloud accounts. By converting user-related features into embeddings using sentence transformers and applying unsupervised learning techniques, the anomalous access service can effectively detect anomalous access patterns and flag users who may potentially pose a security risk.

Accordingly, examples disclosed herein can efficiently detect anomalous employee access patterns in large or small organizations, thus addressing the challenge of identifying unusual or unnecessary access privileges to sensitive resources, where traditional systems and approaches fail. By using advanced sentence-based feature embeddings with unsupervised learning, examples overcome the limitations of more traditional rule-based approaches for detecting subtle access anomalies. Examples can provide an automated, adaptive, scalable system useful for enhancing an organization's permission security posture and streamlining access control management, and in some examples, utilizing a proactive mechanism to identify risks before even granting user permissions in the first place.

In some examples, the anomalous access service combines a natural language processing technique with unsupervised machine learning to create a more intelligent and adaptive access control system. In some examples, sentence transformers are utilized to convert a set of complex employee attributes into meaningful numerical representations that are particularly useful for anomaly detection as they capture subtle contextual relationships. In some examples, an anomaly detection model such as one based on an Isolation Forest algorithm can utilize these embeddings, enabling unsupervised detection of access anomalies without predefined rules that are commonly utilized in existing approaches. This AI-driven approach, in some examples, can be incorporated into new or existing access management workflows, potentially providing a preventative control mechanism. Examples thus allow for a more nuanced, context-aware, and scalable approach to access control that can adapt to evolving organizational structures and access patterns.

For example, traditional access control approaches often require extensive manual effort, including analyzing resources and principals to determine appropriate access levels, creating and maintaining complex rule sets accordingly, and conducting regular access reviews. Examples disclosed herein can utilize an unsupervised approach that significantly reduce such manual workloads by supporting the ability to automatically process large volumes of employee data and identify anomalies, making it more efficient for large-scale environments. As a result, overbroad access permissions can be manually and/or automatically trimmed down or removed, improving the security of the entire computer platform of the associated organizations.

Further, while traditional systems rely on static rules that require manual updates, examples disclosed herein can automatically adjust to changing access patterns through the unsupervised learning approach. Moreover, through use of advanced sentence transformers, examples can capture nuanced relationships between employee attributes that tag-based systems often miss, leading to more accurate anomaly detection. In some examples, the use of unsupervised anomaly detection models using sentence-based feature embeddings can allow the system to identify unusual access patterns that might not violate any specific rule but yet are statistically anomalous, addressing a key blind spot in traditional rule-based systems.

The anomalous access service can also be used proactively via a preventative control feature to assess potential risks before even granting access, shifting from the typically reactive approach of traditional methods to a proactive security stance.

Examples can thus significantly enhance an organization's ability to manage access control efficiently and effectively, providing substantial benefits even in large, complex environments where manual oversight is challenging.

FIG. 1 is a diagram illustrating an environment for unsupervised anomalous access detection using sentence-based feature embeddings according to some examples. In FIG. 1, an anomalous access service 110 ("AAS") is implemented in a cloud provider network 100 to analyze access permissions involving computing resources 140, which may be hosted or located within the cloud provider network 100 or in another system, such as within a public data center, private data center, in an organization's "on-premises" environment, or the like. Similarly, the AAS 110 can alternatively be implemented in different locations, such as by being a distinct software package deployed in another system, as a library accessed by a software program, or the like. Thus, though aspects of the AAS 110 are described herein as being deployed within a cloud provider network 100 it is to be understood that it can be deployed elsewhere.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users (e.g., via computing devices 104 such as laptops, personal computers, mobile devices, server computing devices, and the like) can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented or hosted using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved. Accordingly, the term "computing resource" 140 is meant to broadly refer to such types of compute resources (e.g., virtual computing devices 144, physical computing hardware 142) and/or other types of software and/or hardware resources, such as software 146, data 148, accounts 150 (providing access to various resources), and like, which can be directly or indirectly utilized by users.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, one or more users 102 (via use of one or more computing devices 104) may seek to utilize or interact with one or more computing resources 140 and/or services hosted within a cloud provider network 100. For example, a first user 102A (e.g., an administrator of an organization) may utilize a computing device 104A to interact with the cloud provider network 100 to determine whether another user 102B (or set of users), such as an end-user, have access permissions involving cloud computing resources 140 that are anomalous (compared to other users, such as other existing or previous users of the organization) such that the permissions should be further investigated and/or modified.

Accordingly, in some examples, the user 102A at circle (1) may utilize one or more interfaces provided (or exposed) by the cloud provider network 100, such as via use of a browser-based application, a standalone application, a command line, etc., to configure and/or explore anomalous employee access detection via interaction with an anomalous access service 110. For example, the user 102A may provide configuration information 111 associated with the organization and/or associated users, such as by providing the anomalous access service 110 with an identifier of entity data 134 (or entity data 134 itself). Entity data 134 may be stored within an access control service 130 (e.g., that may or may not implement a rule-based access control mechanism 138) or system as part of permissions or directory data, in another data store such as a human resources database or user directory stored in or outside of the cloud provider network 100, etc. The entity data 134 generally includes metadata associated with a particular set of users, such as users within a particular organization or collection of organizations, team, group, department, city, or the like. The entity data 134 can include, by way of example, information such as employee job titles, employee classes, departments, working locations, working hours, time zone, pay, duration of employment, duration of working on a particular team or group or project, supervisor names, supervisor job titles, names of colleagues or team members, job titles of colleagues or team members, and the like. Accordingly, as part of the operations associated with circle (2), the user 102A may provide an identifier of one or more locations for this entity data 134 or services storing it, optionally along with credentials or tokens for accessing the entity data 134, etc.

Also with regard to circle (2), the user 102A may optionally provide configuration information 111 to the anomalous access service 110, associated with these users, indicating what permissions the users have for corresponding computing resources 140 in the form of permission data 136. This may include the user 102A providing identifiers of where the permission data 136 is located or stored (e.g., within access control service 130), providing the actual permission data 136 itself (e.g., by uploading a file, "pasting" or inputting the permission data into a text field user interface element, etc.), or the like. The permission data 136 may be formatted in a variety of ways known or derivable to those of skill in the art and may identify a particular access permission for a particular user (or set of users 120) for a particular computing resource (or set of computing resources 140). As a simple example, a user 102B with a user identifier (e.g., username) of "J_DOE" may have an associated access permission of "read, write, delete" for a particular storage resource (e.g., a "bucket" or "folder" provided by a storage service that can store objects) meaning that this user can read or write or delete data objects within the storage resource, while another access permission for another user (e.g., a username of "S_KIM") may only have a "read" permission for that same storage resource, meaning they can only read objects from the location but not write (e.g., create new, or overwrite) or delete them.

In some examples, though, the permission data 136 may not be a separate aspect but rather be inherent to a selection of users made by the administrative type user 102A. For example, user 102A may identify a set of users have a common set of permissions and cause the entity data 134 for only these users to be used as part of the system (e.g., for training and/or utilizing an anomalous access engine 114 as described herein). For example, the user 102A may seek to explore all users having a particular type of access to a particular resource—e.g., those users having the ability to launch or terminate a compute instance—and thus the user 102A can cause data for only those users to be collected and used.

The configuration information 111, in some examples, can also include user-selected (or customized) sentence templates used by a feature extractor 116. Sentence templates provide the logic necessary for creating sentences, based on entity data 134, that can then be used for generating embeddings (e.g., a vector of numeric values) that can be operated on by a detection engine 118 to identify anomalous user access permissions as described later herein.

With this configuration information 111, at circle (3) the training orchestrator 112 module can cause the anomalous access engine 114 to be customized via training. This can occur responsive to the user 102A, having provided the anomalous access service 110 with the configuration information 111, sending a request (or command) to the anomalous access service 110 to train or configure itself for use. In a scenario where the configuration information 111 identifies a location of the entity data 134 (and optionally permission data 136), the training orchestrator 112 can obtain the relevant data via use of these identifiers, e.g., by sending requests for the data and receiving it from the corresponding sources, by fetching it from databases or data stores, or the like. In other scenarios, the configuration information 111 may already include the entity data 134 (and optionally permission data 136) itself and may thus skip this step.

This data 134/136 is then provided to (or made available to, such as through storage at an accessible storage location)

the anomalous access engine 114. The anomalous access engine 114, at circle (4), initiates processing via a feature extractor 116. The feature extractor 116, based on the entity data 134 such as employee-related features like as job titles, employee classes, departments, working locations, supervisor job titles, etc., can create sentences, using sentence templates, which are then converted into embeddings (or numerical representations). This creation of embeddings, based on sentences, can use a sentence transformer type machine learning (ML) model that can extract the semantic meaning of features as whole sentences, capturing the context and relationships between different entity attributes. Sentence transformer models commonly operate by mapping one or more sentences into a multi-dimensional dense vector space (e.g., into a 768-dimensional vector of numbers); many such transformer models are known to those of skill in the art, such as text-to-text transfer transformers (T5), models based on Bidirectional Encoder Representations from Transformers (BERT), GTR models, or the like.

This approach substantially differs from other tag-based access control systems or the use of more fine-grained token-based or word-based embeddings, allowing for a more comprehensive and contextual understanding of the users' profiles.

With these embeddings (and optionally permission data 136), at circle (5) the anomalous access engine 114 can train a detection engine 118. Detection engine 118 can include an anomaly detection ML model that can be trained based on the embeddings and used to determine how anomalous a particular input embedding is from other embeddings. Many such anomaly detection models and algorithms are known to those of skill in the art, such as unsupervised anomaly detection models like DeepSVDD, ECOD, Copula-Based Outlier Detection (COPOD), Isolation Forest, k-means, one-class support vector machine, angle-based outlier detection (ABOD), or the like.

The training of the detection engine 118 can be implemented in a variety of ways. For example, the collection of embeddings can be split into a variety of sets that are used in different stages—e.g., a training set for initial training, a development set for further tuning, a test set to evaluate the model, etc. This training process can also include identifying a threshold value useful in identifying which embeddings (and thus, which users) are significantly different from other embeddings such that they are considered anomalous. For example, as part of the training process (e.g., based on a model tuning phase), different threshold values can be evaluated to show how many users would be considered anomalous. These threshold values can be selected or configured based on the preferences of the implementor or user 102A, e.g., a lower threshold value can be selected to cause more users to be labeled as anomalous (at the risk of having comparatively more false positives) whereas a higher threshold value can be selected to cause fewer users to be labeled as anomalous (at the risk of having comparatively more false negatives). In some examples, the anomalous access engine 114 can be configured to self-identify a threshold value based on a heuristic (e.g., such that a threshold is selected that causes a particular percentage of the embeddings to be deemed anomalous), and in some examples the threshold value can be based on inputted preferences from a user (e.g., user 102A), such as whether they wish to be more or less aggressive in detecting potential anomalies, or even by allowing the user to select or provide a specific anomaly score threshold value directly (e.g., set the numeric value by providing the specific value they wish to be utilized). Yet further, in some use cases a user may dynamically adjust the threshold value, such as to increase the number of anomalous items found, in order to explore the "edge case" findings, whether to aid in the creation of rules for a rule-based complimentary system, to confirm that the system is using a correct threshold value, etc.

Thus, a threshold 122 for a particular user 102A, organization, computing resource 140, etc., can be configured and used by an analyzer 120 to determine whether an anomaly score generated by the detection engine for an embedding (corresponding to a user) meets or exceeds the threshold and thus is to be considered anomalous. Accordingly, a large set of users can be analyzed to identify particular ones of interest as being anomalous, which can be presented to a user 102A at circle (7) via one or more user interfaces 124 provided or supported by the anomalous access service 110. In some examples, an administrator type user 102A may potentially use this information to create or improve access control configurations, such as by updating a rule-based access control mechanism 138 with additional rules to prevent (or allow) certain users or groups to have access to particular resources.

Additionally, or alternatively, the user 102A may utilize the anomalous access service 110 to examine a single user's permissions at a time, such as by providing entity data 134 (and optionally permission data 136) for the user and invoking the anomalous access engine 114 to cause it to generate a sentence, generate an embedding based on the sentence, and then determine whether the embedding is sufficiently anomalous from existing embeddings. In some examples, such functionality may similarly be invoked by another system, such as an access control service 130 when a new user/employee is being added to a group (e.g., new hires to an organization, new team member being added, etc.) or having new permissions associated with their user account. Thus, the access control service 130 can call the anomalous access service 110 with a request to analyze a particular user to determine whether that user would be deemed to be anomalous (and thus worthy of investigation, and/or refusal of the request to add the user to the group) or not. This can thus be used as a preventative control that helps organizations proactively identify and mitigate potential access risks before granting permissions.

In some examples, the anomalous access service 110 may thus train and maintain a collection of different detection engines 118, where different detection engines (e.g., unsupervised anomaly detection models) may be trained for different resources, and/or trained based on different collections of users (having a particular set of permissions, for example). Thus, the anomalous access service 110 may, for a particular request, determine which detection engine 118 is to be utilized by analyzing the request—e.g., determining which computing resource is involved, which user or set of permissions is involved, etc.—and then identifying the corresponding model trained for that scenario.

In some examples, the anomalous access service 110 may provide a set of interfaces 127 that the user 102A (or another software-based system) can utilize to configure and/or perform anomalous access analysis, view results, etc. For example, the interface may cause a display to be presented to the user 102A (e.g., via sending data for a webpage or application to the computing device 104A of the user 102A) to display relevant information about any users that are "flagged" as being anomalous, such as their name, job roles, department, work history, etc. The display may also provide a representation of the constructed sentence for that user that was used for anomalous access detection, enabling the user to reason as to why the user access is being deemed anomalous.

Accordingly, examples disclosed herein can provide for automated detection of anomalous employee access patterns, reducing the manual effort required for access reviews and audits. This can result in an improved security posture through the identification of employees with unusual or unnecessary access to sensitive resources, provide enhanced risk mitigation by proactively addressing potential insider threats and access control misconfigurations, and/or preventatively identify and alert on anomalous access requests before granting permissions and exposing resources to these users. Moreover, in some examples, the system is readily scalable in that it can handle large volumes of employee permission data across multiple systems and departments and can complement and enhance classical deterministic access control methods by discovering anomalies that may be overlooked by rule-based approaches. Further, examples can provide a heuristic-based detection approach that adapts to evolving access patterns and identifies anomalies that may not be captured by static rules.

Figure 2:
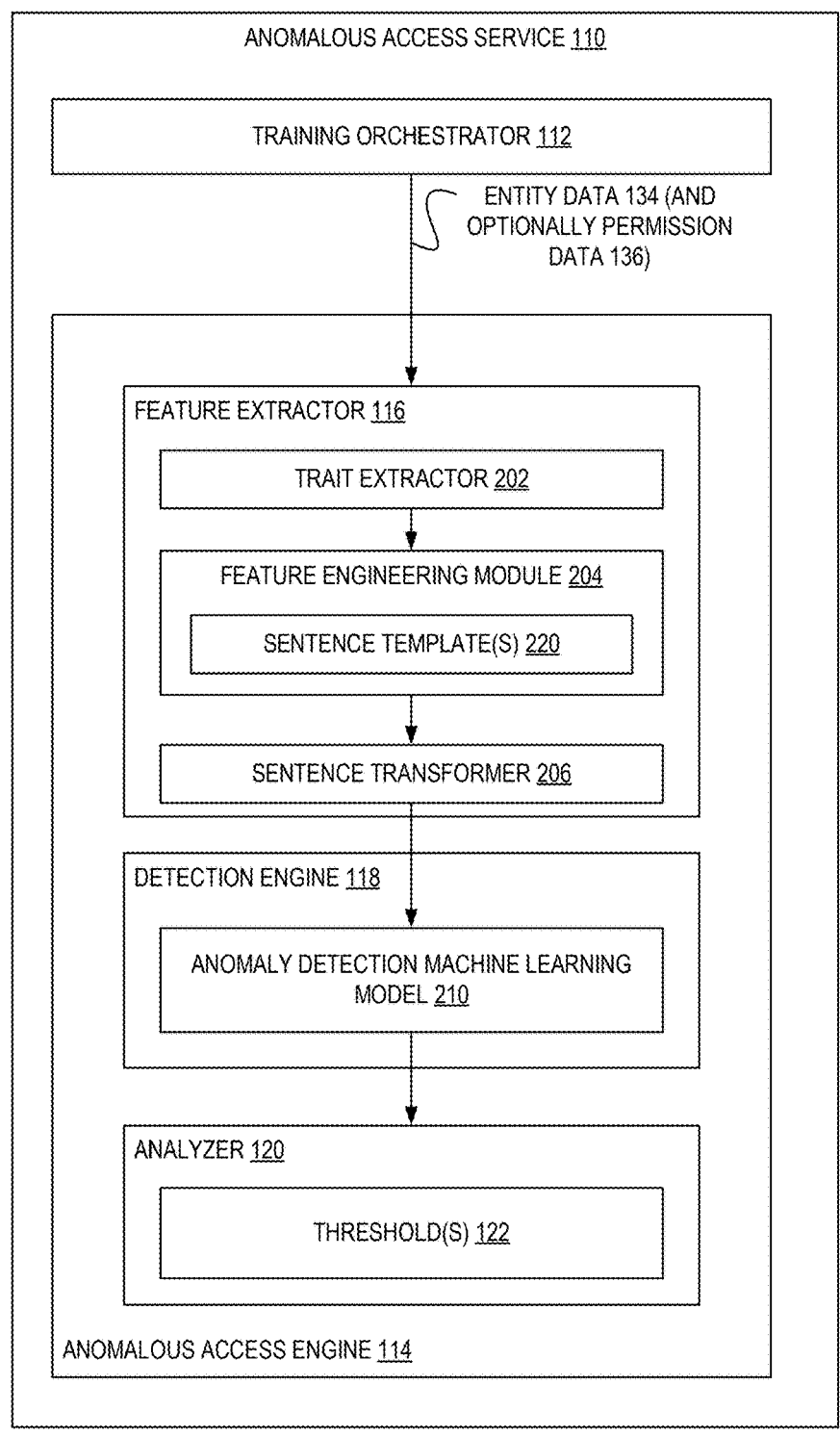
FIG. 2 is a diagram illustrating training an anomalous access engine used in an environment for unsupervised anomalous access detection using sentence-based feature embeddings according to some examples.

For further detail, FIG. 2 is a diagram illustrating training an anomalous access engine used in an environment for unsupervised anomalous access detection using sentence-based feature embeddings according to some examples. As discussed, the anomalous access service 110 can configure, or train, an anomalous access engine 114 via a training coordinator 112 that gathers or otherwise obtains entity data for a set of users—e.g., a set of users having a common set of permissions for accessing a particular computing resource or set of resources. The training orchestrator 112 can provide this entity data (optionally along with other data, such as permission data 136) to a feature extractor 116 of the anomalous access engine 114, where a trait extractor 202 can first identify or extract relevant data fields from the entity data (and/or other data, such as relevant data fields from permission data 136). This can be used, for example, when the entity data is provided as a large data object (e.g., a JSON or XML file) having multiple data elements stored within, and thus the trait extractor 202 may be used to identify the fields and the corresponding values carried within this data.

With this arranged data, a feature engineering module 204 can generate a sentence for each involved user. For example, a configured sentence template that specifies a format for a sentence can be used to generate a sentence, where placeholder variables in the template can be "filled in" (or swapped out) with the corresponding values from the arranged entity data 134. This can be based on entity data 134, permission data 136, and/or other types of data.

This string carrying a natural language sentence is then provided as an input to a sentence transformer 206 that generates an embedding for the sentence, such as a dense vector of values that represent the sentence.

These embeddings can thereafter be provided to a detection engine 118 and thus used to train an anomaly detection machine learning model 210. In some examples, this training will ultimately result in a threshold 122 being configured that can be used, by an analyzer 120, to separate those embeddings that are anomalous from those that are determined to not be anomalous. For example, the anomaly detection machine learning model 210 may generate an anomaly score (e.g., a number between 0 and 1) for an inputted embedding indicative of how anomalous it is compared to other embeddings, and the threshold 122 value (e.g., a value of 0.7) may be compared to the per-embedding anomaly score to determine if that embedding, and thus the user it corresponds to, is anomalous.

In some examples, permission data 136 may also be provided by the training orchestrator 112 along with the entity data 134. In such cases, the corresponding permissions for a user can be used as part of the process as well—e.g., a sentence template may reference both entity data 134 and permission data 136. For example, a sentence constructed based on a sentence template may indicate that "This user works in Seattle, Washington as a Software Engineer II and has read and write permissions," where "Seattle, Washington" and "Software Engineer II" were taken from the entity data 134 while the "read and write permissions" comes from the permission data 136.

Figure 3:
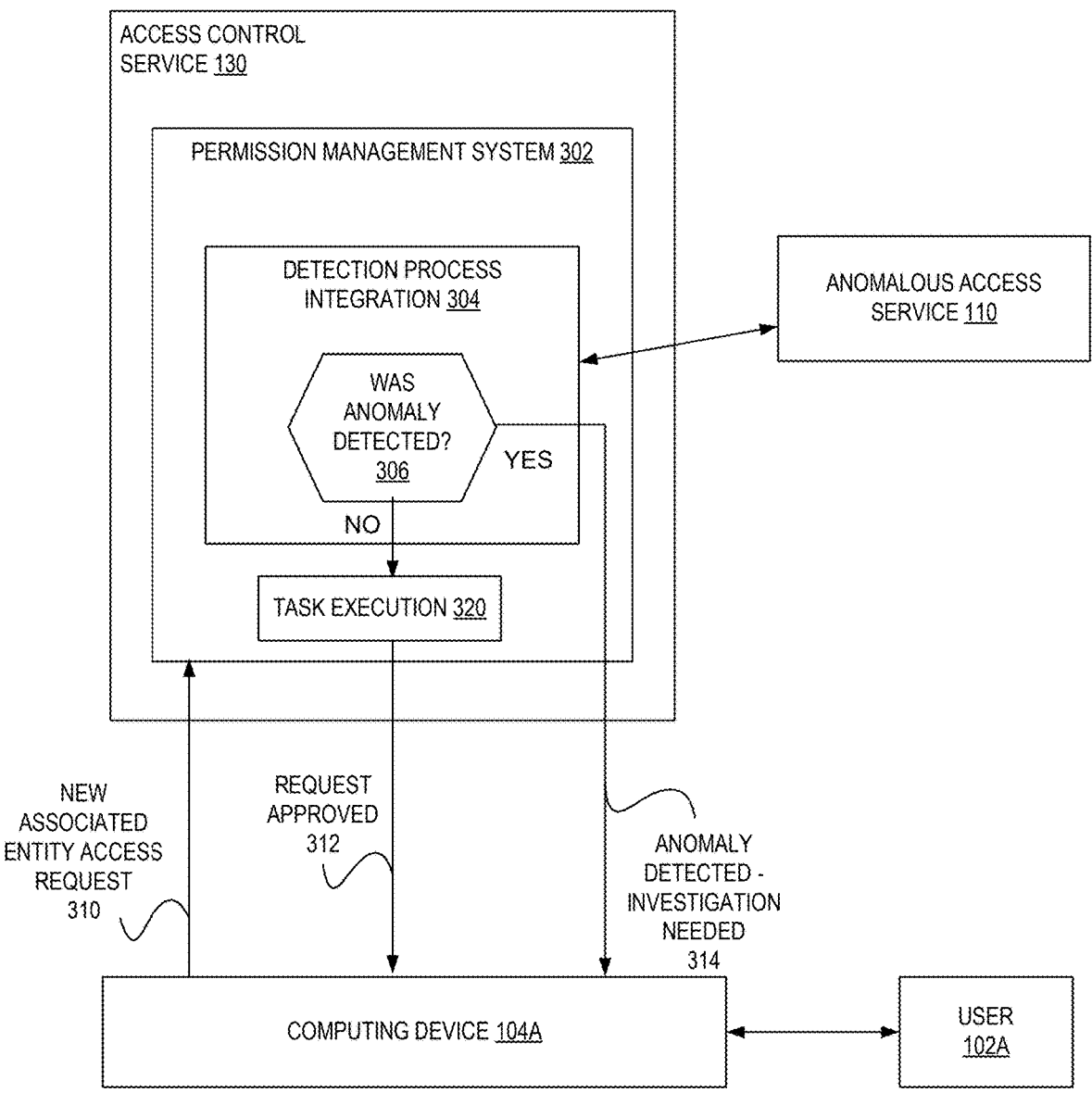
FIG. 3 is a diagram illustrating unsupervised anomalous access detection for a new associated entity access request using sentence-based feature embeddings according to some examples.

As indicated herein, the anomalous access service 110 can be used by a variety of users or systems for a variety of purposes. One such example is shown in FIG. 3, which is a diagram illustrating unsupervised anomalous access detection for a new associated entity access request using sentence-based feature embeddings according to some examples. As shown, a user 102A may act as an administrator for an organization and utilize an access control service 130 to manage accesses to computing resources. The user 102A may seek to add a new user into the system, or change some aspect associated with a user (e.g., by adding the user to a new team), etc., and send a request to make this change (e.g., add a new user into the system, add a new user into a group) as new associated entity access request 310 to a permission management system 302.

The permission management system 302 may, as part of this process, utilize the anomalous access service 110 to determine whether the modification would make the resultant user configuration be anomalous with respect to other existing users of the organization. Thus, the permission management system 302 may have a detection process integration 304 component that can send a request to the anomalous access service 110 to determine whether the resultant user configuration would be anomalous, where the request may carry the relevant entity data for the user (after the change would be made). As described herein, the anomalous access service 110 can use this entity data to create a sentence, generate a sentence-based embedding, and determine if that is anomalous with regard to other sentence-based embeddings of other users. The anomalous access service 110 may transmit a response back to the detection process integration 304 indicating whether it would be anomalous or not, where the response may also include information such as the anomaly score, the applied anomaly threshold, the sentence that was constructed, etc.

With the response, a decision block 306 may be executed whereby the detection process integration 304 can determine if the response indicates that the resultant user configuration would be anomalous, the permission management system 302 can send a response 314 back to the requesting user computing device 104A indicating that the request would lead to an anomalous access configuration, and asking the user to confirm that it should be done nonetheless, and/or enabling the user 102A perform further investigation (e.g., providing relevant entity information, providing result data returned by the anomalous access service 110 (such as the anomaly score and/or sentence), etc. However, at decision block 306 if the response is not anomalous, the permission management system 302 may execute the requested action (by task execution 320 module, such as adding the user to a new group) and return an "approved" or "success" type response 312.

Figure 4:
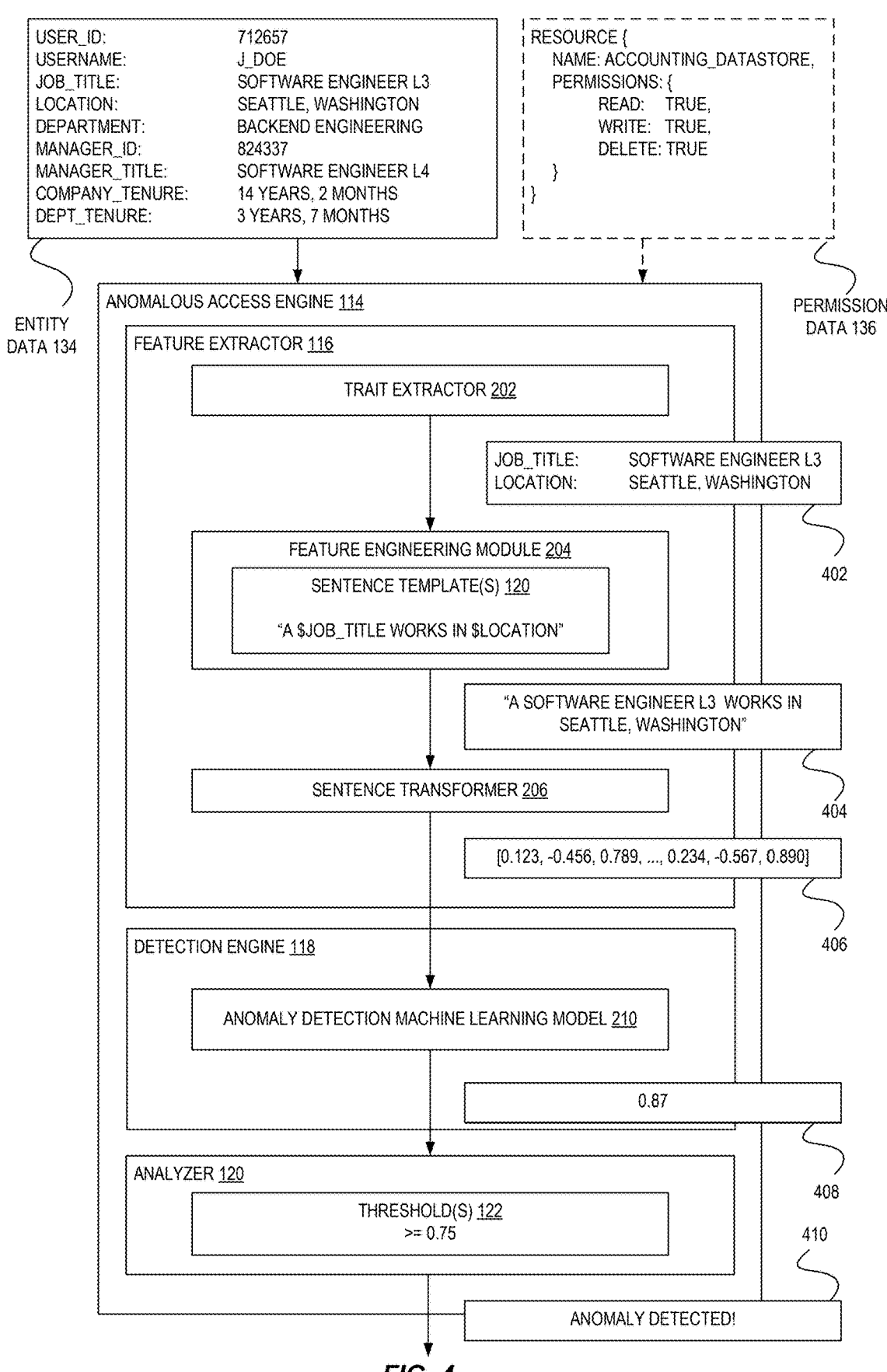
FIG. 4 is a diagram illustrating exemplary user-based processing for unsupervised anomalous access detection using sentence-based feature embeddings according to some examples.

For more tangible examples, FIG. 4 and FIG. 5 are provided to illustrate scenarios with simplified data moving throughout the system for the sake of understanding. Specifically, FIG. 4 is a diagram illustrating exemplary user-based processing for unsupervised anomalous access detection using sentence-based feature embeddings according to some examples. As shown, a set of entity data 134 for a particular user is shown, including a user identifier, username, job title, location, department, manager identifier, manager title, company tenure, department tenure, etc. Optionally, permission data 136 for the user can also be provided, here shown as identifying a particular computing resource (e.g., via a resource identifier of "accounting_datastore") and a set of permissions, here reflecting that the user can read, write, and delete objects from that resource.

The trait extractor 202 can thus "extract" some or all of the entity information data elements; here, only the "needed" elements 402 are extracted that are identified based on which are reflected in, and thus needed by, the associated sentence template 420—here, the "job_title" and "location" data elements. However, as indicated herein, other types of traits from other types of data can be utilized—e.g., permission data 136. As one example, the name of a resource can be identified and extracted, specific permissions can be identified and extracted, etc.

This extracted set of data elements are provided to the feature engineering module 204, which constructs a sentence 404 may replacing the data element placeholders in the service template 420 (here, reflected by variables having a $ sign beginning the word—$JOB_TITLE and $LOCA-TION). The resulting sentence 404 is a natural language string of "A software engineer L3 works in Seattle, Washington." Of course, in some cases where permission data 136 is also included, this could also be incorporated into the sentence via a different sentence template that references those data elements, e.g., "A software engineer L3 works in Seattle, Washington, and has read, write, and delete permissions for accounting_datastore."

This sentence 404 is used by the sentence transformer 206 to construct a sentence-based embedding 406, which here is a dense vector of numbers that represent the sentence. This embedding is provided as an input to the anomaly detection machine learning model 210, which generates an anomaly score 408 of "0.87."

This anomaly score 408 is then compared to the configured threshold 122 (here, of 0.75) to determine whether the user is anomalous—in this case, the value of 0.87 is greater than or equal to the threshold, so a result 410 is generating indicating that the user is anomalous.

Notably, this system can also be extended or adapted for various other purposes. For example, instead of seeking users that have anomalous access permissions, in some examples the system is adapted to find anomalous network or computing activity. To this end, FIG. 5 is a diagram illustrating exemplary network-based processing for unsupervised anomalous access detection using sentence-based feature embeddings according to some examples.

As shown, the system may be trained based on computing or network activity associated with a particular computing resource or set thereof, such as observed network traffic, system or application logs, or the like, to allow the detection of anomalous computing activity for the sake of system management, system security, and the like. In this example, training data 502 is obtained from one or more SSH servers in a computing environment indicative of activity of the servers related to received requests (e.g., to open connections to the server). Here, the training data 502 includes individual records (or "lines") related to different events or activities involving a server—here, a session being closed, a public key being accepted for a particular user during a login, a session being opened, etc.

Thereafter, other data elements referred to as access data 504 may be provided to be tested to identify whether these data elements are anomalous. In this case, the access data 504 is a single event corresponding to a public key being accepted for a particular user.

This access data 504—which again may be in a machine-generated "log" type format—can be provided to an trait extractor 202 that identifies various entities 510 within the access data 504, such as a timestamp, hostname, event_type, user, IP address, etc.

These entities 510 can be used by the feature engineering module 204 with a sentence template 120 causing a natural language sentence to be generated describing the event, here that "At 9 am, the host server1 just accepted publickey for user1 from network address 192.168.1.100." The sentence transformer 206 can then create a sentence-based embedding 514 from this sentence 512, which can be evaluated by the anomaly detection machine learning model 210 to generate an anomaly score 516—here, of 0.12. Based on a threshold 122 of "0.5", the analyzer 120 determines that the event is not anomalous and may report that the access is approved 518. Accordingly, such an operation can be performed on a periodic basis to examine recent activity of a recent time period, or possibly even in near real-time to assist in decision making or quickly implement remediative measures (e.g., denying a request, enabling additional reporting or analysis, restricting certain accesses, notifying administrators, etc.).

The disclosed aspects largely are presented around the detection of anomalous user permissions and/or anomalous computing or network activity detection such as detecting anomalous accesses; however, it is to be appreciated that this is just one configuration and use case of these techniques. Accordingly, other types data can be used as input from potentially other types of data sources for the same or different use cases. Further, in some examples, these techniques can be combined with explainable AI techniques to provide users with insights into the reasons behind detected anomalies. In other examples, adaptive thresholding can be applied based on an involved organization's risk appetite and security policies.

FIG. 6 is a flow diagram illustrating operations 600 of a method for unsupervised anomalous access detection using sentence-based feature embeddings according to some examples. Some or all of the operations 600 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the anomalous access service 110 of the other figures.

The operations 600 include, at block 602, receiving a request, at an anomalous access service (AAS) of a cloud provider network, to determine whether an access or permission involving a user for a computing resource hosted in the cloud provider network is anomalous. In some examples, the request pertains to a proposed addition of the user to a group of an organization or a proposed configuration of permissions for the user.

The operations 600 further include, at block 604, generating, by the AAS, a string value based on a template and at least some metadata associated with the user, the string value comprising a natural language sentence.

In some examples, the metadata comprises employee information of an organization, and the operations 600 further include obtaining, by the AAS, the metadata from the electronic directory. In some examples, the string value includes a textual description of one or more of: a job title of the user; a work location of the user; a job title of a manager of the user; a department name or department identifier of the user; or an amount of time that the user has been with the organization or within a subgroup of the organization.

The metadata, in some examples, includes computing activity metadata collected from one or more host computing devices of the cloud provider network.

The operations 600 further include, at block 606, transforming, by the AAS, the string value into a vector embedding based on use of a first machine learning (ML) model.

The operations 600 further include, at block 608, determining, by the AAS, that the access or permission is anomalous, comprising providing the vector embedding as an input to a second ML model, wherein the second ML model was trained using other vector embeddings generated based on sentences corresponding to other users.

In some examples, the first ML model is a sentence transformer model; and the second ML model is an unsupervised anomaly detection model.

In some examples, determining that the access or permission is anomalous comprises obtaining an anomaly score as a result of providing the vector embedding as the input to the second ML model. In some examples, determining that the access or permission is anomalous further comprises determining that the anomaly score meets or exceeds a threshold value. The threshold value can be a user-configured value provided by a different user. In some examples, the threshold value is determined as part of the training of the second ML model.

The operations 600 further include, at block 610, causing, by the AAS, an indication of the determination to be provided (e.g., presented via a user interface, transmitted to another system or client for use or display, etc.).

The operations 600 further include, in some examples, selecting, by the AAS based on the request, at least one of the first ML model or the second ML model for use. For example, multiple versions of the second ML model may be trained and made available for use, which may be trained for accesses to particular computing resources or permissions for particular computing resources, trained based on particular collections of users, etc. Thus, the system might have many different versions of a second ML model (e.g., an anomaly detection model) available and may select the relevant one based on the request—e.g., based on an identified computing resource associated with the request, based on a user associated with the request (e.g., who originated the request, or who is reflected by the user whose access permissions or accesses are under consideration), etc.

Figure 7:
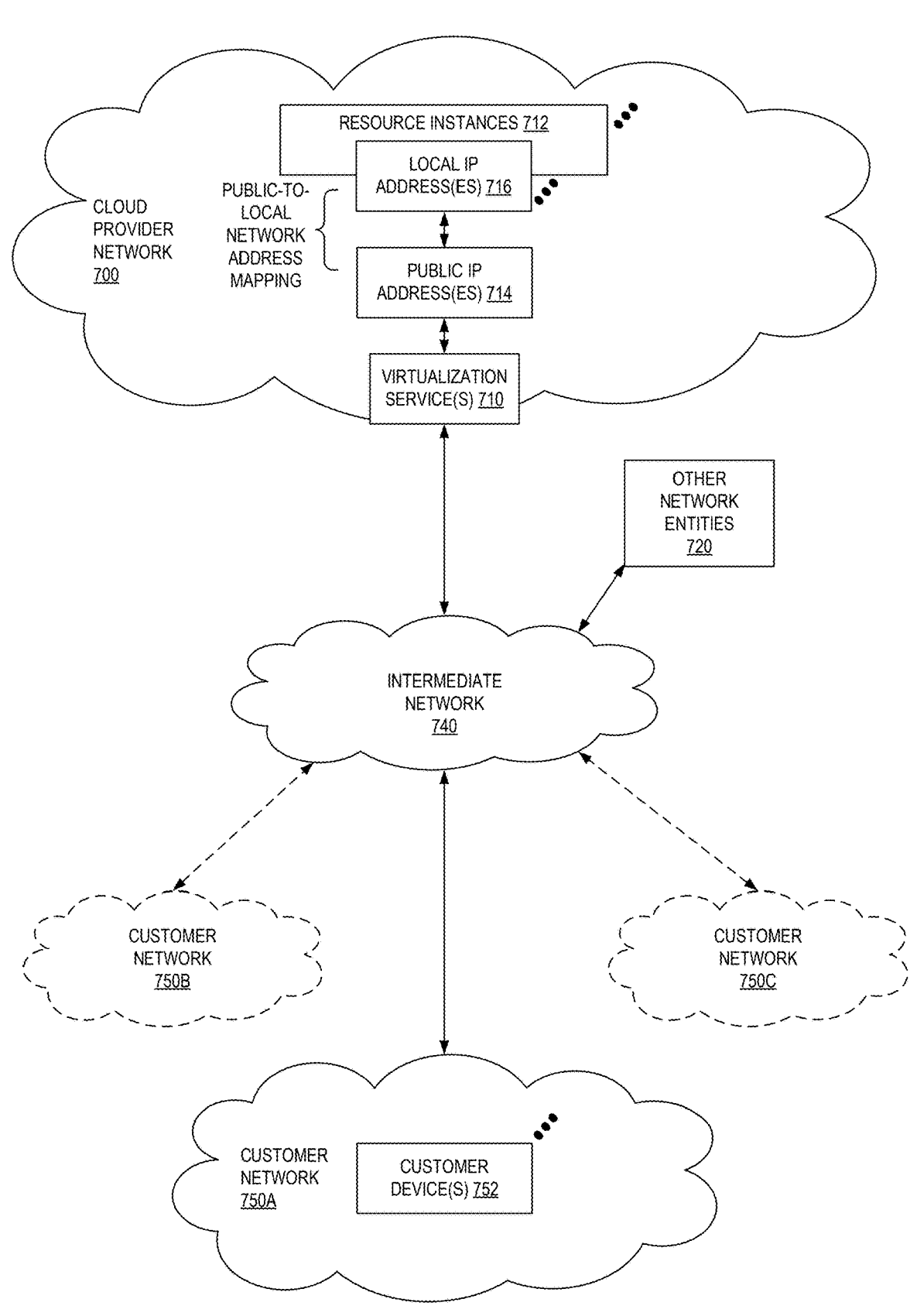
FIG. 7 illustrates an example cloud provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
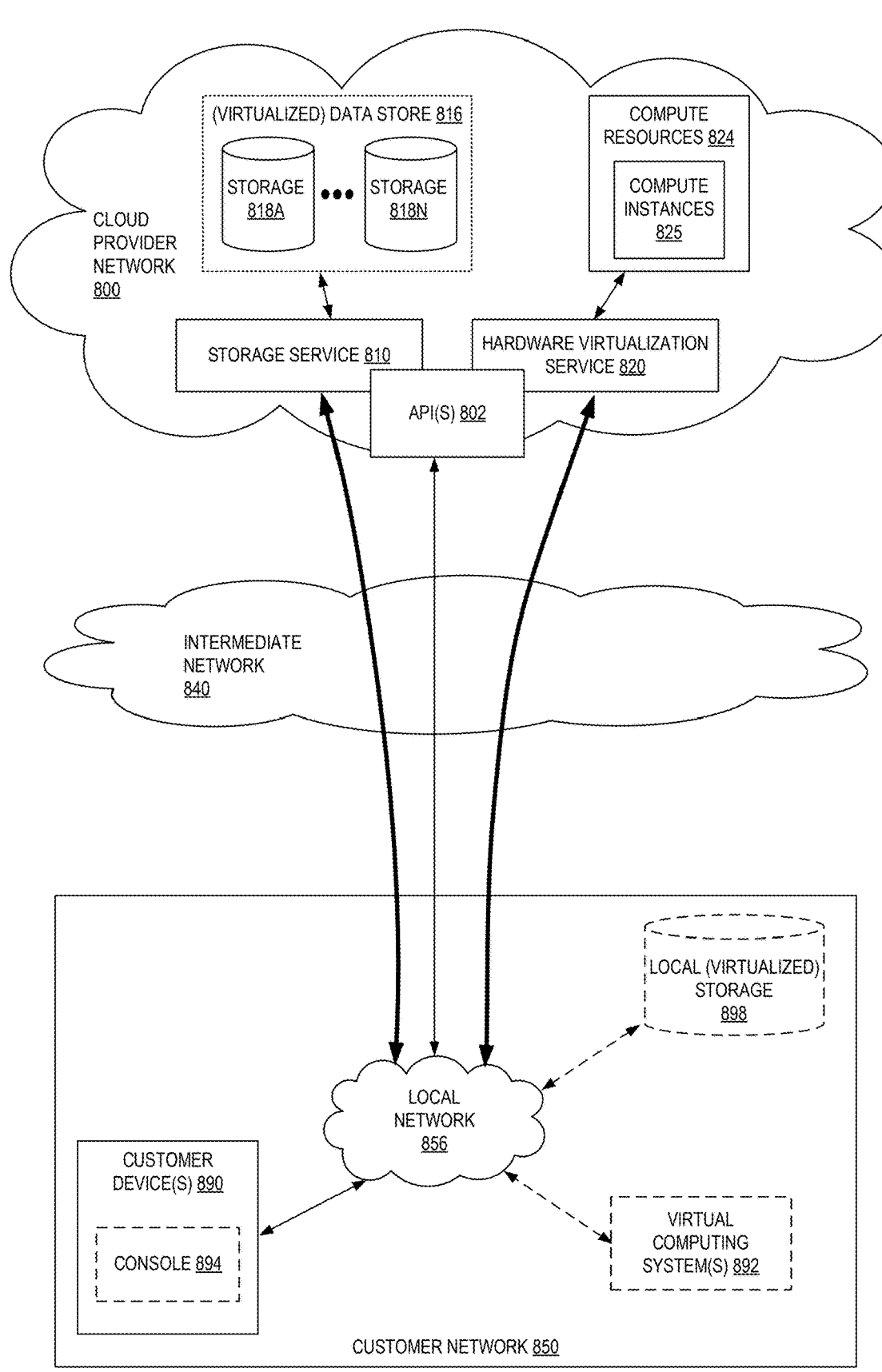
FIG. 8 is a block diagram of an example cloud provider network that provides a storage service and a hardware virtualization service to users according to some examples.

FIG. 8 is a block diagram of an example provider network environment that provides a storage service and a hardware virtualization service to users, according to some examples. A hardware virtualization service 820 provides multiple compute resources 824 (e.g., compute instances 825, such as VMs) to users. The compute resources 824 can, for example, be provided as a service to users (or "customers") of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
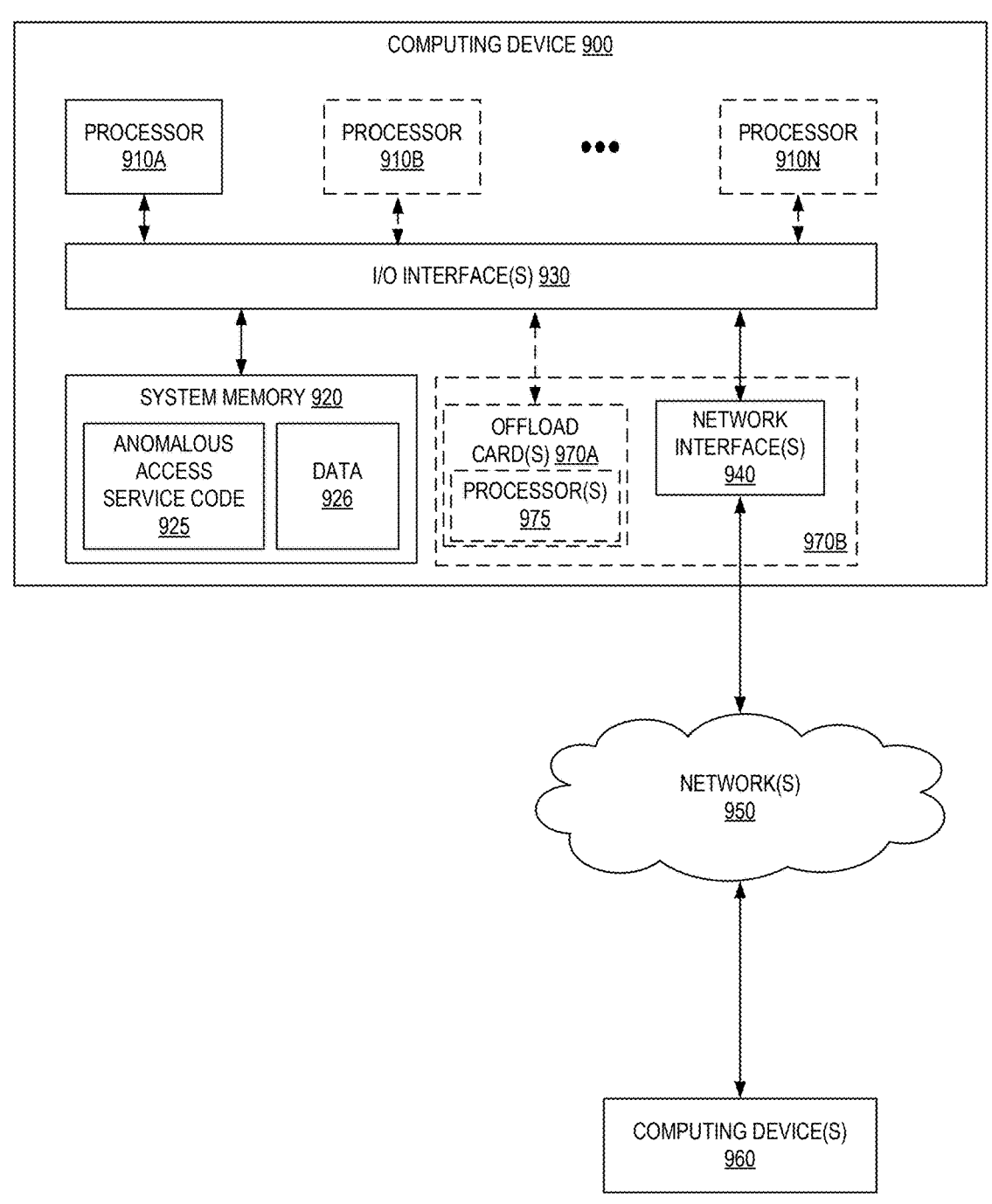
FIG. 9 is a block diagram illustrating an example computing device that can be used in some examples.

In some examples, a system that implements a portion or all of the techniques described herein can include a general-purpose computer system, such as the computing device 900 (also referred to as a computing system or electronic device) illustrated in FIG. 9, that includes, or is configured to access, one or more computer-accessible media. In the illustrated example, the computing device 900 includes one or more processors 910 coupled to a system memory 920 via an input/output (I/O) interface 930. The computing device 900 further includes a network interface 940 coupled to the I/O interface 930. While FIG. 9 shows the computing device 900 as a single computing device, in various examples the computing device 900 can include one computing device or any number of computing devices configured to work together as a single computing device 900.

In various examples, the computing device 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as anomalous access service code 925 (e.g., executable to implement, in whole or in part, the anomalous access service 110) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computing device 900 and other computing devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computing device 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 900 via the I/O interface 930. A non-transitory computer-accessible storage medium can also include any volatile or non-volatile media such as RAM (e.g., SDRAM, double data rate (DDR)

SDRAM, SRAM, etc.), read only memory (ROM), etc., that can be included in some examples of the computing device 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving a request, at an anomalous access service (AAS) of a cloud provider network, to determine whether a permission for a user to access a computing resource hosted in the cloud provider network is anomalous;

generating, by the AAS, a string value based on a template and at least some metadata associated with the user, the string value comprising a natural language sentence, the natural language sentence including, from the metadata, at least a job title of the user and a geographic location of the user;

transforming, by the AAS, the string value into a vector embedding based on use of a first machine learning (ML) model, wherein the first ML model is a sentence transformer model;

determining, by the AAS, that the permission for the user to access the computing resource is anomalous, comprising providing the vector embedding as an input to a second ML model, wherein the second ML model comprises an unsupervised anomaly detection model that was trained based on a collection of embeddings corresponding to other users;

causing, by the AAS, an indication to be presented, via a user interface, that the user having the permission to access the computing resource is anomalous;

receiving, at the cloud provider network, a request to remove or disable the permission to access the computing resource for the user; and updating, by the cloud provider network, a permissions datastore to remove or disable the permission to access the computing resource for the user.

2. The computer-implemented method of claim 1, wherein determining that the permission to access the computing resource is anomalous comprises:

obtaining an anomaly score as a result of providing the vector embedding as the input to the second ML model; and determining that the anomaly score meets or exceeds a threshold value.

3. The computer-implemented method of claim 2, wherein:

the threshold value is a user-configured value provided by a different user; or the threshold value is determined as part of a training of the second ML model.

4. A computer-implemented method comprising:

receiving a request, at an anomalous access service (AAS) of a cloud provider network, to determine whether an access or permission involving a user for a computing resource hosted in the cloud provider network is anomalous;

generating, by the AAS, a string value based on a template and at least some metadata associated with the user, the string value comprising a natural language sentence;

transforming, by the AAS, the string value into a vector embedding based on use of a first machine learning (ML) model;

determining, by the AAS, that the access or permission is anomalous, comprising providing the vector embedding as an input to a second ML model, wherein the second ML model was trained using other vector embeddings generated based on sentences corresponding to other users; and causing, by the AAS, an indication of the determination to be provided.

5. The computer-implemented method of claim 4, wherein determining that the access or permission is anomalous comprises obtaining an anomaly score as a result of providing the vector embedding as the input to the second ML model.

6. The computer-implemented method of claim 5, wherein determining that the access or permission is anomalous further comprises determining that the anomaly score meets or exceeds a threshold value.

7. The computer-implemented method of claim 6, wherein the threshold value is a user-configured value provided by a different user.

8. The computer-implemented method of claim 6, wherein the threshold value is determined as part of the training of the second ML model.

9. The computer-implemented method of claim 4, wherein the metadata comprises employee information of an organization, and wherein the method further comprises obtaining, by the AAS, the metadata from the electronic directory.

10. The computer-implemented method of claim 9, wherein the string value includes a textual description of one or more of:

a job title of the user;

a work location of the user;

a job title of a manager of the user;

a department name or department identifier of the user; or an amount of time that the user has been with the organization or within a subgroup of the organization.

11. The computer-implemented method of claim 4, wherein the metadata comprises computing activity metadata collected from one or more host computing devices of the cloud provider network.

12. The computer-implemented method of claim 4, wherein the request pertains to a proposed addition of the user to a group of an organization or a proposed configuration of permissions for the user.

13. The computer-implemented method of claim 4, wherein:

the first ML model is a sentence transformer model; and the second ML model is an unsupervised anomaly detection model.

14. The computer-implemented method of claim 4, further comprising:

selecting, by the AAS based on the request, at least one of the first ML model or the second ML model for use.

15. A system comprising:

a first one or more computing devices to implement a storage service in a multi-tenant cloud provider network, the storage service to store metadata associated with a user; and a second one or more computing devices to implement an anomalous access service (AAS) in the multi-tenant cloud provider network, the AAS including instructions that upon execution cause the AAS service to:

receive a request to determine whether an access or permission involving the user for a computing resource hosted in the cloud provider network is anomalous;

obtain the metadata from the storage service;

generate a string value based on a template and at least some of the metadata associated with the user, the string value comprising a natural language sentence;

transform the string value into a vector embedding based on use of a first machine learning (ML) model;

determine that the access or permission is anomalous, comprising providing the vector embedding as an input to a second ML model, wherein the second ML model was trained using other vector embeddings generated based on sentences corresponding to other users; and cause an indication of the determination to be provided.

16. The system of claim 15, wherein to determine that the access or permission is anomalous the AAS is at least to obtain an anomaly score as a result of providing the vector embedding as the input to the second ML model.

17. The system of claim 16, wherein to determine that the access or permission is anomalous the AAS is at least further to determine that the anomaly score meets or exceeds a threshold value.

18. The system of claim 17, wherein the threshold value is a user-configured value provided by a different user.

19. The system of claim 17, wherein the threshold value is determined as part of a training of the second ML model.

20. The system of claim 15, wherein the string value includes a textual description of one or more of:

a job title of the user;

a work location of the user;

a job title of a manager of the user;

a department name or department identifier of the user; or an amount of time that the user has been with an organization or within a subgroup of the organization.

* * * * *